United States Patent [19]
Umezu et al.

[11] Patent Number: 4,641,935
[45] Date of Patent: Feb. 10, 1987

[54] CAMERA

[75] Inventors: Takao Umezu; Minoru Ishiguro; Tetsuo Nishizawa, all of Omiya, Japan

[73] Assignee: Fuji Photo Optical Co., Ltd., Saitama, Japan

[21] Appl. No.: 780,005

[22] Filed: Sep. 25, 1985

[30] Foreign Application Priority Data

Sep. 28, 1984 [JP] Japan .................. 59-203084

[51] Int. Cl.$^4$ ................................. G03B 1/12
[52] U.S. Cl. ................................. 354/173.11
[58] Field of Search .................. 354/173.1, 173.11

[56] References Cited

U.S. PATENT DOCUMENTS 4,540,261 9/1985 Matsumoto et al. ........... 354/173.11
4,572,637 2/1986 Inoue ............................. 354/173.11

Primary Examiner—Michael L. Gellner
Attorney, Agent, or Firm—Parkhurst & Oliff

[57] ABSTRACT

An automatic winding camera wherein winding operations such as wind-up, rewinding, frame feed, etc. of a film are automatically performed.

In the camera according to the present invention, when the absence of the film in a film running path in a camera is detected by a film detecting device during winding of the film, a control device controls a driving device for driving a film winding mechanism to operate until a film winding detecting device detects that at least a predetermined length of the film is wound up. With this arrangement, when the film is rewound into a magazine after the takings, the forward end portion of the film can be entirely received in the magazine, so that such disadvantages can be obviated that dust intrudes into and light falls into the magazine.

5 Claims, 5 Drawing Figures

FIG. I

CAMERA

BACKGROUND OF THE INVENTION

1. Field of the Invention

This invention relates to an automatic winding camera wherein winding operations such as wind-up, rewinding, frame feed, etc. of a film are automatically performed and more particularly to a film winding device of a camera.

2. Description of the Prior Art

In the automatic winding camera of the type described, upon completion of successive takings of a film, the film is rewound into a magazine by a motor incorporated in the camera. The camera is of such an arrangement that, when the absence of the film in a film running path in the camera is detected by a film detecting switch provided at a position close to the film running path during rewinding of the film, the motor is stopped in operation by a control circuit.

However, during rewinding of the film, if the motor for rewinding is stopped in operation when the film detecting switch is turned from on to off, then, although some of the film is rewound into the magazine due to the inertial force after the stop of the motor in operation, the film as a whole is not entirely rewound into the magazine and the rewinding operation comes to end with the forward end portion of the film being not received in the magazine. An opening of the magazine, through which the film goes in and out, generally fits in with the width of the film. When only the portion narrow in width of the forward end portion of the film remains outside the magazine, gaps are formed between the opposite ends of the aforesaid opening and the film, thus presenting the disadvantage that dust intrudes and light falls into the magazine through the gaps.

SUMMARY OF THE INVENTION

The present invention has been developed to obviate the above-described disadvantages of the prior art and has as its object the provision of a camera wherein, when the film is used up and received in a magazine, the film can be completely rewound into the magazine up to the very forward end portion of the film.

To this end, the present invention features that, when the absence of the film in a film running path is detected by film detecting means, such a control is made by controlling means that means for driving a film winding mechanism is operated until film winding detecting means further detects that at least a predetermined length of the film is wound.

BRIEF DESCRIPTION OF THE INVENTION

The exact nature of this invention, as well as other objects and advantages thereof, will be readily apparent from consideration of the following specification relating to the accompanying drawings, in which like reference characters designate the same or similar parts throughout the figures thereof and wherein:

FIG. 1 is an electric circuit diagram showing a circuit arrangement in the film winding device of the camera, to which the present invention is applied; and FIGS. 2 to 5 are flow charts showing the contents of programs when the motor control circuit shown in FIG. 1 is implemented by a microcomputer.

DETAILED DESCRIPTION OF THE INVENTION

Detailed description will hereunder be given of the preferred embodiment of the film winding device of a camera according to the present invention with reference to the accompanying drawings.

In this embodiment, description is given of the case where the present invention is applied to a so-called previously wound type camera wherein a magazine is loaded in a magazine chamber, prior to takings, the film is continuously wound up from the magazine to a spool, and thereafter, the film is reversely fed one frame after another for takings.

Figure 1:
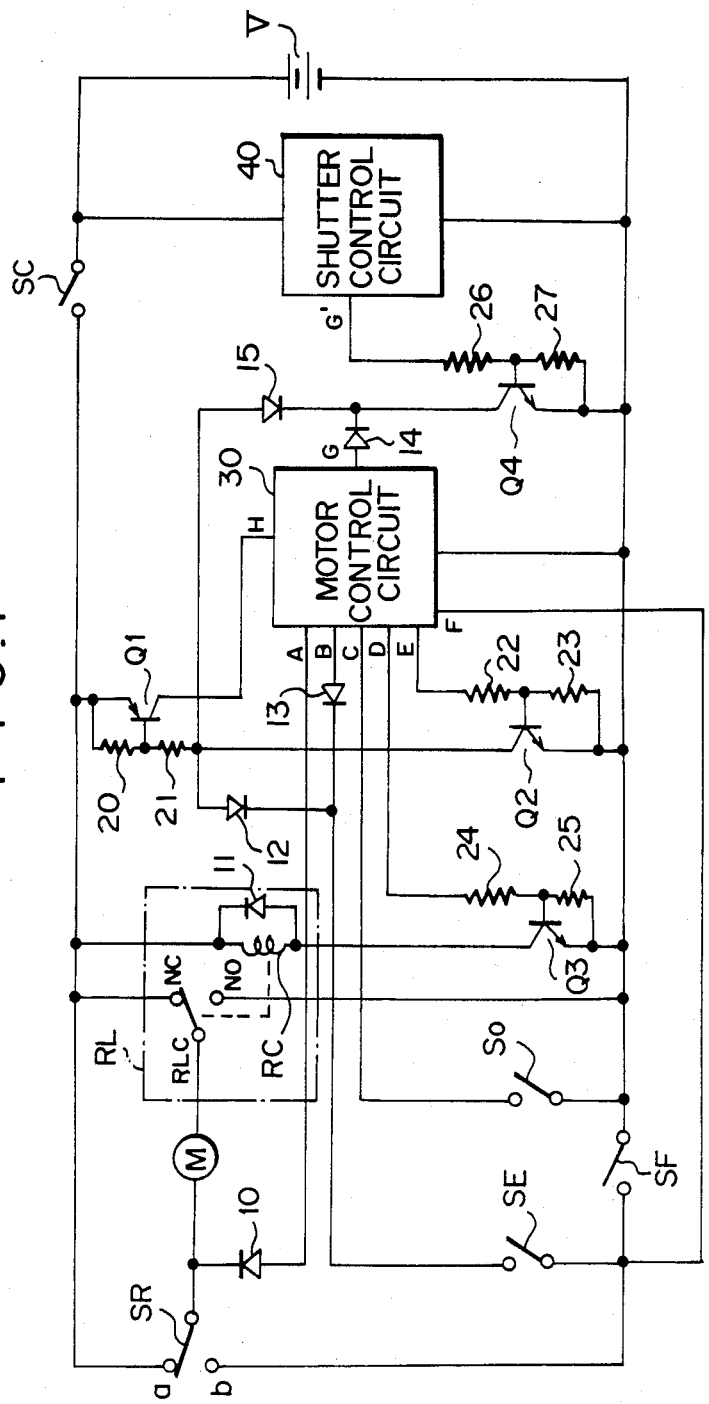

FIG. 1 shows an electric circuit of the film winding device of the previously wound camera, to which the present invention is applied. In the drawing, the electric circuit comprises:

a battery V;

a spool disposed in a spool chamber, for winding the film (in this specification, the term "winding" includes "rewinding");

a driving motor M for driving a transmission mechanism such as a gear train and a winding mechanism including a winding shaft of the magazine and the like;

a control circuit 30 for controlling power supply to the driving motor M;

a power switch SC for on-off operating due to opening or closing of a rear lid of the camera;

a mode changeover switch SR for changing a previously winding mode over to a taking mode or vice versa;

a counter switch SE interlocked with a counter, adapted to be turned on only when the indication of the counter is positioned within a range from a position on the side of a position END slightly apart from 1 (this is an indication of the absence of the film) to the position END during the taking mode, and in the previously winding mode;

a film detecting switch SF for detecting the presence or absence of the film;

a one-frame switch SO for detecting that one frame of the film is wound up;

a relay RL;

switching transistors Q1~Q4;

diodes 10~15; and resistors 20~27 for bias.

A shutter control circuit 40 has no direct relation to the film winding device, however, when a wind-up signal is outputted from an output terminal G' as will be described hereunder, the winding operation of the film is performed. Therefore, the circuit 40 is shown for the sake of convenience in explanation.

Out of the above-described switches, the mode changeover switch SR is normally switched to the side of a contact point b (previously winding mode), and, when the previous winding of the film is completed, the switch SR mechanically detects a tensile force applied to the film and is automatically switched to the side of a contact point a (taking mode).

Furthermore, the film detecting switch SF is disposed at a position close to a film running path in the camera, when the film is present in the film running path, a contact point of the switch SF is constantly pressed by an end face of the film, whereby the switch SF is on, and, when the film is absent in the film running path, the switch SF is off.

Further, the one-frame switch SO is adapted to be turned off each time one frame of the film is fed and a sprocket makes one turn, and to be on normally.

The motor control circuit 30 takes in detection outputs from the aforesaid switches and controls power supply to the driving motor depending on the operating conditions of the camera, i.e., whether the camera is in the previously winding mode or the taking mode, and whether the film is loaded or not. Herein, designated by A∼H are input and output terminals of the motor control circuit.

In this embodiment, the motor control circuit 30 is implemented by the microcomputer, however, the present invention need not necessarily be limited to this, and, the control circuit 30 may be formed by a sequence circuit.

Description will hereunder be given of the contents of processing of the program when the motor control circuit 30 is implemented by a microcomputer with reference to flow charts shown in FIGS. 2 to 5.

When, firstly, the magazine is loaded in the magazine chamber of the camera, the rear lid is closed and the power switch SC is turned on, the switching transistor Q1 is brought into conductive condition, whereby power is supplied from a battery V to a power source terminal H of the motor control circuit 30 to bring the motor control circuit 30 into operation, so that the program is started. Then, in Step 100, judgment is made as to whether B=0 or not, namely, whether a voltage level at a terminal B is on the low level or not, i.e. both the counter switch SE and the film detecting switch SF are on or not.

The fact that both the counter switch SE and the film detecting switch SF are on means that the camera is either in the previously winding mode or the taking mode and the film is in the condition of being present in the film running path of the camera. Moreover, in the taking mode in this case, the counter indication of the film is positioned within a range from a position on the side of a position END slightly apart from 1 to the position END (corresponding to three frames of the film) and only a leading portion at the forward end of the film remains.

Furthermore, when B=1, namely, a voltage level at the terminal B is on the high level, either one of the following conditions is regarded to be present. Namely, the counter switch SE is off and the film detecting switch SF is on, the counter switch SE is on and the film detecting switch SF is off, or both the counter switch SE and the film detecting switch SF are off. The fact that both the switches SE and SF are off means such conditions that the camera is switched to the taking mode, further, the counter indication of the camera indicates one of numbers 1∼36 when a film for taking 36 frames is loaded for example, and the film is not present in the film running path in the camera, which conditions are impossible to exist logically.

In consequence, the fact that B=1 means a condition in which either the counter switch SE is off and the film detecting switch SF is on or the counter switch SE is on and the film detecting switch SF is off. This fact means that the film is present in the camera, the camera is switched to the taking mode, and, speaking of the aforesaid example, the counter indication of the film indicates one of the numbers 1∼36, or the camera is in the taking mode and the counter indication of the film is positioned within the range from the position on the side of the position END slightly apart from 1 to the position END.

Now, in Step 100, when B=0, namely, both the counter switch SE and the film detecting switch SF are on, then, in Step 101, a high level signal is delivered from a terminal E to the base of the transistor Q2, whereby the transistor Q2 is brought into the conductive condition, so that power supply to a power source terminal H of the motor control circuit 30 is maintained through the transistor Q1.

Subsequently, in Step 102, a timer T provided in the motor control circuit 30 is reset, and, in Step 103, judgment is made as to whether A=1 or not, namely, whether a voltage level at a terminal A is on the high level or not, i.e. whether the camera is in the taking mode (at this time, the counter indication is positioned within the range from the position on the side of the position END slightly apart from 1 to the position END) or not. Here, immediately after the magazine is loaded in the magazine chamber, the camera is in the previously winding mode and the mode changeover switch SR is switched to the side of the contact point b. In consequence, in Step 103, it is judged that A=0, namely, the camera is in the previously winding mode, and then, the routine proceeds to Step 104. In the Step 104, after the magazine is loaded, judgment is made as to whether a time duration t1 has elapsed after the previous winding of the film or not. Namely, in the condition where a relay coil RC of the relay RL is not energized, a relay contact point RLC is switched to the side of a normally closed contact point NC, whereby the driving motor M is rotatably driven immediately after the magazine is loaded, so that the previous winding is started. Here, as the time duration t1, there is selected a time duration necessary and sufficient for the completion of the previous winding of the film, and set at 60∼80 sec. for example.

When it is judged that the time duration t1 has not elapsed in Step 104, the routine returns to Step 103, where the same judgment as aforesaid is made, and, until the time duration t1 elapses, the judgments in the Step 103→Step 104→Step 103 are repeated. In the Step 103, when it is judged that A=1, namely, the camera is switched to the taking mode before the time duration t1 has elapsed after the start of the previous winding, the routine proceeds to Step 111.

On the other hand, in the Step 104, when it is judged that the time duration t1 has elapsed before the switching of the camera to the taking mode, namely, it is judged that the previous winding is not completed (this means that the driving motor M is not operated due to lowered capacity of the battery), in the succeeding Step 105, a high level signal is outputted from a terminal D of the motor control circuit 30 to the base of the transistor Q3. As the result, the relay contact point RLC is switched to the side of a normally opened contact point NO, whereby the driving motor M is short-circuited, so that power supply to the driving motor M is cut off. In Step 106, the timer T is reset. Subsequently, in Step 107, judgment is made as to whether F=0 or not, namely, whether a voltage level at a terminal F of the motor control circuit 30 is on the low level or not, i.e. whether the film detecting switch SF is on or not.

When it is judged that F=0, namely, the film detecting switch SF is on (the condition in which the film is present in the running path) in the Step 107, then, in the succeeding Step 108, judgment is made as to whether a time duration t2 has elapsed or not after the stop of power supply to the driving motor M. Here, the time duration t2 is a time duration required for recovering the capacity of the battery (in this embodiment, for example, a lithium battery is used), and set at 10~15 min. for example. Then, until the time duration t2 elapses, the processings in the Step 108→Step 107→Step 108 are repeated. When the time duration t2 elapses, the routine proceeds to Step 109, where a low level signal is outputted from the terminal D of the motor control circuit 30 to the transistor Q3. As the result, the transistor Q3 is brought into the non-conductive condition and the relay coil RC is deenergized, whereby the relay contact point RLC is switched to the side of the normally closed contact point NC, so that the driving motor M begins to rotate.

After the driving motor M is rotated in the Step 109, the routine returns to the Step 102. Subsequently, in the Step 103, judgment is made as to whether A=1 or not, namely, whether the camera is switched to the taking mode or not.

When it is judged that the previously winding mode still remains in the Step 103, the routine proceeds to the Step 104 and the same processings as aforesaid are performed in the Steps 104~109.

On the other hand, when it is judged that the camera is switched to the taking mode in the Step 103, the routine proceeds to the Step 111. When the previously winding mode is completed, the mode changeover switch SR is switched to the side of the contact point a (the taking mode). Now, in the Step 111, a high level signal is outputted from the terminal D of the motor control circuit 30 to the base of the transistor Q3. As the result, the transistor Q3 is brought into the conductive condition, whereby the relay coil RC of the relay RL is energized to switch the relay contact point RLC to the side of the normally opened contact point NO, so that power is supplied to the driving motor M from the battery V to wind the film in a direction opposite to the previously winding mode.

Further, in Step 112, the timer T is reset and in Step 113, judgment is made as to whether C=0 or not, namely, whether the one-frame switch SO is on or not. Here, the fact that the one-frame switch SO is on means that the film is in a wound state.

Figure 3:
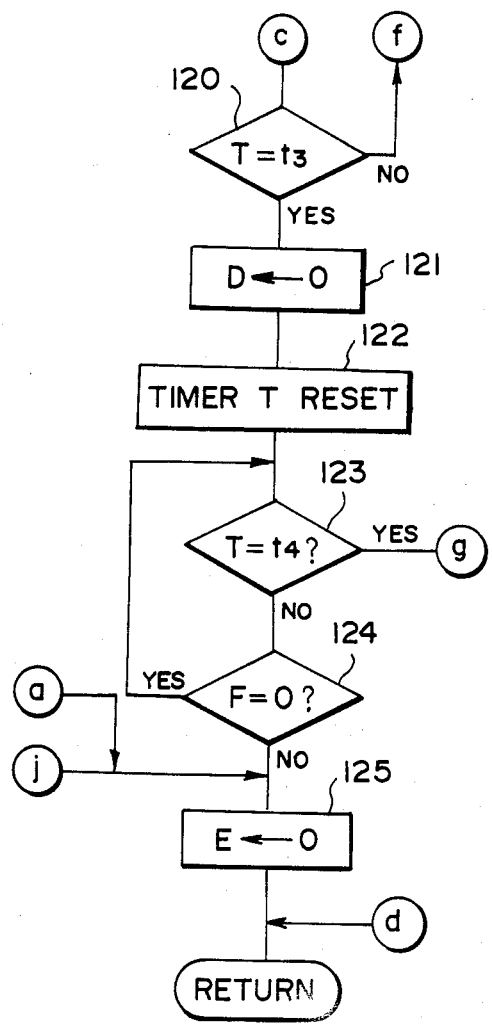

Now, when the one-frame switch SO is on in the Step 113, the routine proceeds to Step 130 (FIG. 4), and, when the one-frame switch SO is off in the Step 113, the routine proceeds to Step 120 (FIG. 3).

Furthermore, in the Step 107, when F=1, i.e., the film detecting switch SF is off (the condition of no film), namely, the film is extracted while the battery V is waiting until it recovers the capacity, power is supplied to the driving motor M in Step 110, so that the driving motor M is rotated. After the processing in the Step 110, the routine skips to Step 125 (FIG. 3), where a low level signal is outputted from the terminal E of the motor control circuit 30 to the base of the transistor Q2. As the result, the transistor Q2 is brought into the non-conductive condition, and the hold of power source voltage from the battery V to the power source terminal H of the motor control circuit 30 is released, thus completing this program. As described above, the Steps 103~110 and the Step 125 are a series of processings for implementing the functions of the previously winding mode, and the Steps other than the above are the processings for mainly implementing the functions of the taking mode.

Now, in the Step 100, when B=1, namely, the counter switch SE is off and the film detecting switch SF is on, i.e. the counter indication of the film indicates one of the numbers 1~36 (in the case of the film for taking 36 frames) during the taking mode, the routine proceeds to Step 114. In Step 114, judgment is made as to whether G=0 or not, namely, whether a voltage level at a terminal G of the motor control circuit 30 is on low level or not, i.e. whether a wind-up signal is outputted to the base of the transistor Q4 from a terminal G' of the shutter control circuit 40 or not, upon completion of the shutter operation of the camera. Then, in the Step 114, when it is judged that G=1, namely, the wind-up signal is not outputted from the shutter control circuit 40, i.e. the camera is still in a state of preparing for taking, the program is brought to the end as it is.

Furthermore, in the Step 114, when it is judged that G=0, namely, the wind-up signal is outputted from the shutter control circuit 40, the routine proceeds to Step 115, where high level signals are outputted from the terminals E and D of the motor control circuit 30, whereby the power source voltage to the motor control circuit 30 is held, the relay RL is operated and power is supplied from the battery V to the driving motor M.

On the other hand, when it is judged that C=1, namely, the one-frame switch SO is off in the Step 113, the routine proceeds to Step 120 shown in FIG. 3, where judgment is made as to whether a time duration t3 has elapsed or not after the start of power supply to the driving motor M in the Step 111. Here, the time duration t3 is a time duration necessary and sufficient for winding up one frame of the film, and set at 4~8 sec. for example.

Figure 4:
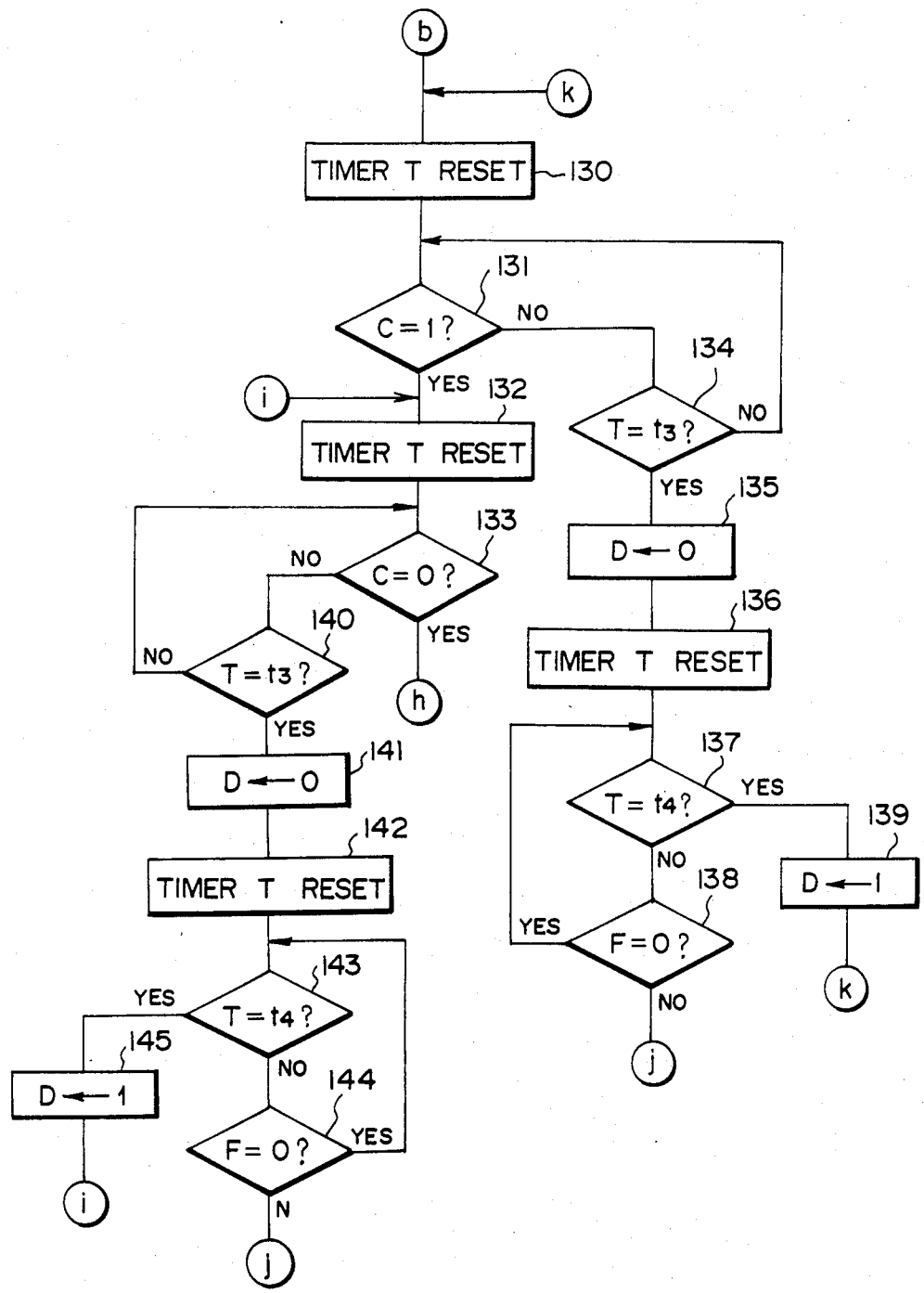

Now, when the one-frame switch SO is turned on before the time duration t3 elapses, the routine proceeds to Step 130 shown in FIG. 4. When the time duration t3 elapses with the one-frame switch SO being off (the condition where, regardless of power supply to the driving motor M, the film is not wound), the routine proceeds to Step 121, where a low level signal is outputted from the terminal D of the motor control circuit 30 to the base of the transistor Q3. As the result, power supply to the driving motor M is stopped and the timer T is reset in Step 122.

Further, in Step 123, judgment is made as to whether a time duration t4 has elapsed after the stop of power supply to the driving motor M or not. Here, the time duration t4 is a time duration required for recovering the capacity of the battery V, and set at 5~6 min. for example. The reason why the capacity recovering time durations t2 and t4 are set in such a manner that t2>t4 is that it is considered that the load of the driving motor M is high during the previously winding mode as compared with the winding operation of the frame feed during the taking mode.

When it is judged that the time duration t4 does not elapse in the Step 123, the judgment is made as to whether F=0 or not, namely, whether the film is present or not, in Step 124. In the Step 124, when it is judged that F=1, namely, the film is extracted while the battery V is waiting until it recovers the capacity, a low level signal is outputted from the terminal E of the motor control circuit 30 to the base of the transistor Q2 in the Step 125, with the result that the hold of power source voltage to the motor control circuit 30 is released, thus completing this program.

On the other hand, when it is judged that, in Step 124, when it is judged that F=0, namely, the film is present, the routine returns to the Step 123, and, after all, until the time duration t4 elapses, the processings of the Step 123→Step 124→Step 123 are repeated.

Figure 2:
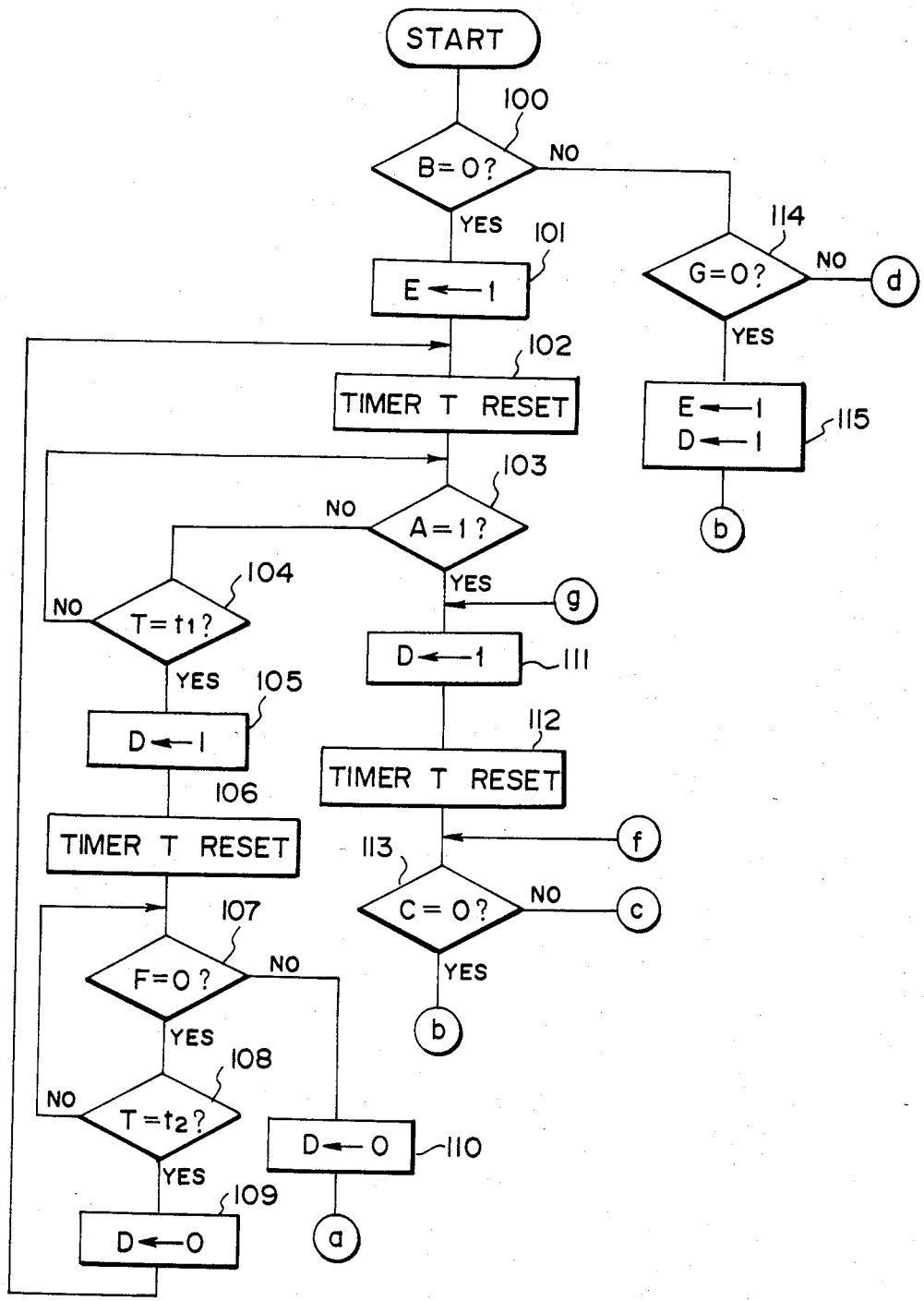
Figure 5:
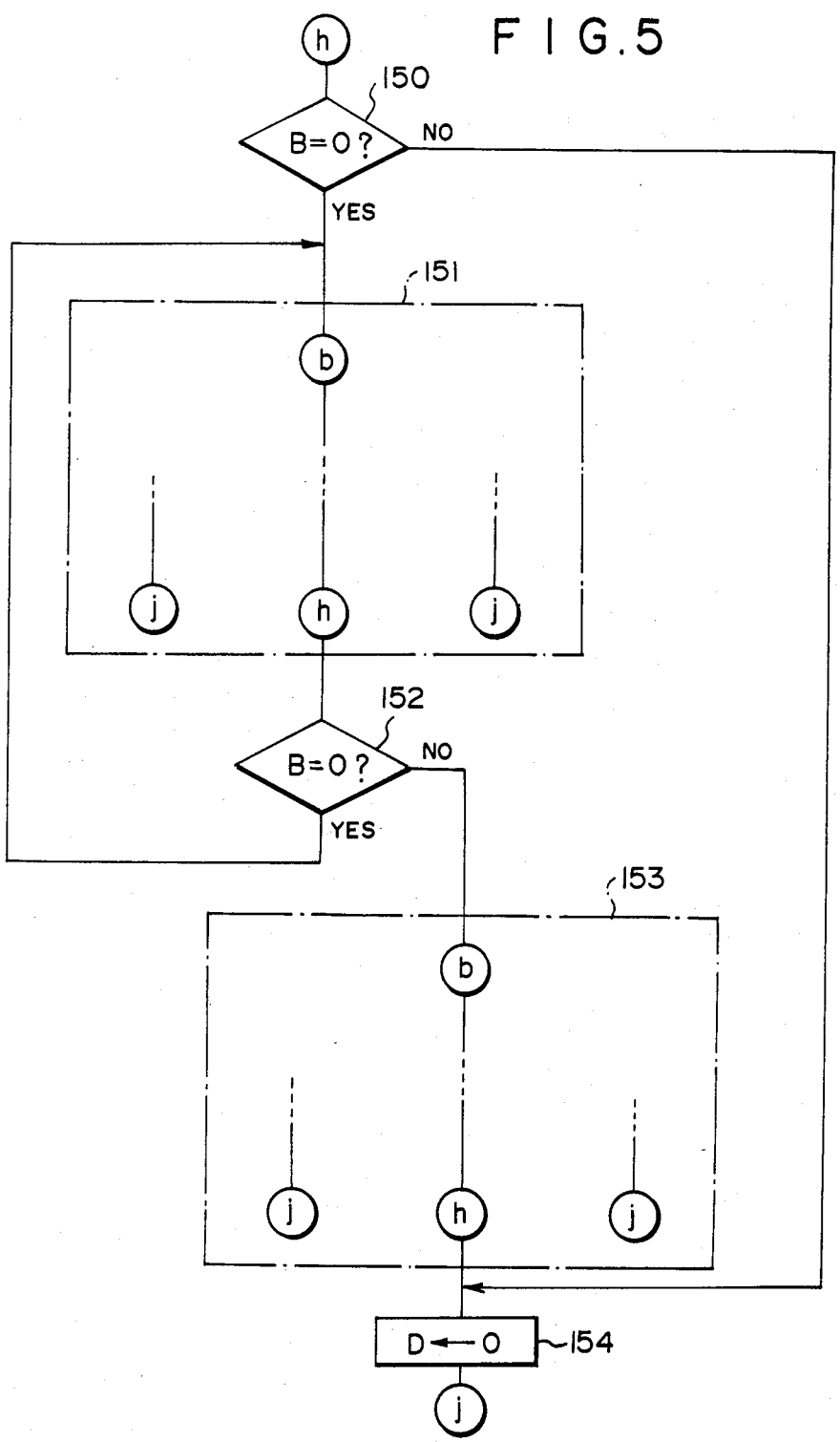

When it is judged that the time duration t4 has elapsed in the Step 123, the routine returns to the Step 111 shown in FIG. 2, and the processings of the Steps 111~113 are performed as aforesaid. Then, in the Step 113, when it is judged that C=0, namely, the one-frame switch SO is turned from off to on, i.e. the driving motor M is rotated and the film is wound up, and after the processings in the Step 115 are performed, the routine proceeds to Step 130 (FIG. 4). In the Step 130, the timer T is reset, and subsequently, in Step 131, judgment is made as to whether C=1 or not, namely, whether the one-frame switch SO is off or not. When it is judged C=0 in the Step 131, the routine proceeds to Step 134, where judgment is made as to whether the time duration t3 for winding up one frame of the film has elapsed or not. In the Step 131, when it is judged that C=1 before the time duration t3 does not elapse, then, in Step 132, the timer T is reset. Subsequently, in Step 133, judgment is made as to whether C=0 or not, namely, the one-frame switch SO turned from off to on or not. When it is judged that C=1 in the Step 133, the routine proceeds to Step 140, where judgment is made as to whether the time duration t3 for winding up the film has elapsed or not similarly to the Step 134. Then, in the Step 133, when it is judged that C=0 before the time duration t3 does not elapse, the routine proceeds to Step 150 (FIG. 5).

Out of the aforesaid proceedings, the processings of the Steps 111→112→113→130→131 or of the Steps 115→130→131 make the one-frame switch SO changed over to the conditions of OFF→ON→OFF and one frame of the film is wound up.

On the other hand, in the Step 134, when the driving motor M is stopped in operation due to lowered capacity of the battery on the way of one frame of the film being wound up, with the one-frame switch SO being on, or, in the Step 140, when the driving motor M is stopped in operation with the one-frame switch SO being off, namely, with the film not being fed one frame after another, the same series of proceedings as shown in FIG. 3, respectively, are performed.

More specifically, power supply to the driving motor M is stopped until the time duration t4 for recovering the capacity of the battery elapses, and, upon the lapse of the time duration t4, power supply to the driving motor M is restored to rotate the driving motor M.

On the other hand, when it is judged that C=0 in the Step 133, then, in the Step 150, judgment is made as to whether B=0 or not, namely, both the counter switch SE and the film detecting switch SF are on or not. In the Step 150, when B=1, namely, the camera is in the taking mode and the counter indication of the film indicates one of the numbers 1~36 (in the case of the film for taking 36 frames), the routine skips to Step 154, where power supply to the driving motor M is stopped, and further, in Step 125, the hold of power source voltage to the motor control circuit 30 is released, thus completing the program.

Furthermore, in the Step 150, when it is judged that B=0, namely, the camera is in the taking mode and the counter indication of the film is positioned within the range from the position on the side of the position END slightly apart from 1 to the position END (corresponding to three frames of the film), the routine proceeds to Step 151, where the same proceedings shown in the flow chart of FIG. 4 (hereinafter referred to as "X") are performed and the film is fed one after another. In Step 152, judgment is made as to whether B=0 or not, and, when it is judged that B=0, the routine returns to the Step 151, and further, the film is fed one frame after another.

In the Step 152, when it is judged that B=1, namely, the frame feed of the film is in progress, the film detecting switch SF is off and only the forward end portion of the film goes out of the magazine, the processings X is performed in Step 153, further, one frame or more of the film is wound up, the forward end portion of the film is entirely received in the magazine, and the routine proceeds to Step 154, where power supply to the driving motor M is stopped, subsequently, the routine proceeds to the Step 125, where the hold of power source voltage to the motor control circuit 30 is released, thus completing the program. During the normal takings where the capacity of the battery V is not lowered as described above, the same processings of the Steps 100→114→115→130→131→132→133→150→154→125 or of the Steps 100~150 as described above are performed, and thereafter, the series of processings of the Steps 150→151→152→153→154→125 are performed.

Additionally, in this embodiment, during rewinding of the film, as the film winding detecting means for detecting that the film is wound by a predetermined length, e.g. one frame or more, after the film detecting switch SF is turned from on to off, the means for inspecting the on-off change in conditions of the one-frame switch SO is used, however, the present invention need not necessarily be limited to this, and, the driving motor M may be operated until a predetermined time duration elapses after the film detecting switch is turned off.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:
    film detecting means, provided in a film running path in said camera, for detecting the presence of a film;
    film winding detecting means for detecting that said film is wound up by a predetermined length;
    driving means for driving a film winding mechanism; and
    control means for taking in detection outputs from said film detecting means and said film winding detecting means to control the operation of said driving means in response to said detection outputs; wherein, when the absence of the film in the film running path is detected by said film detecting means, said control means controls said driving means to operate until said film winding detecting means detects that at least a predetermined length of said film is wound up.

2. A camera as set forth in claim 1, wherein said film detecting means is a switch being on-off operated depending on whether the film is present in said film running path or not, said means being disposed close to said path.

3. A camera as set forth in claim 1, wherein said film winding detecting means is operated each time one frame of the film is fed.

4. A camera as set forth in claim 1, wherein said control means is a microcomputer.

5. A camera comprising:
   a winding mechanism for winding a film;
   driving means having a battery as a power operating condition detecting means for detecting the operating conditions of said camera;
   winding condition detecting means for detecting the winding conditions of the film; and
   control means for taking in detection outputs from said operating condition detecting means and said winding condition detecting means to control power supply to said driving means from said battery in accordance with the operating conditions of said camera and in response to said detection outputs;

wherein, when the film winding operation by said winding mechanism is not completed within a time duration necessary and sufficient for the winding after power supply to said driving means is started, said control means temporarily stops power supply to said driving means, and thereafter, restores power supply to said driving means after a predetermined time duration required for recovering the capacity of said battery elapses.

* * * * *